(No Model.) 2 Sheets—Sheet 1.

J. D. L. JONES.
HAY OR STOCK FRAME.

No. 514,472. Patented Feb. 13, 1894.

Witnesses:
Inventor:
J. D. L. Jones (No Model.) 2 Sheets—Sheet 2.
J. D. L. JONES.
HAY OR STOCK FRAME.
No. 514,472. Patented Feb. 13, 1894.
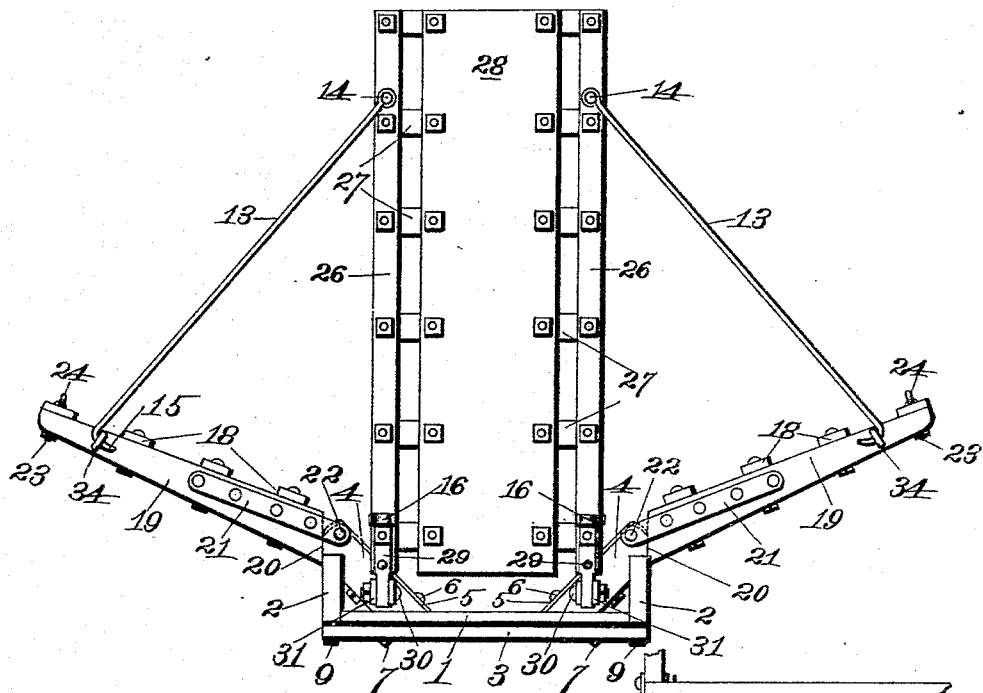
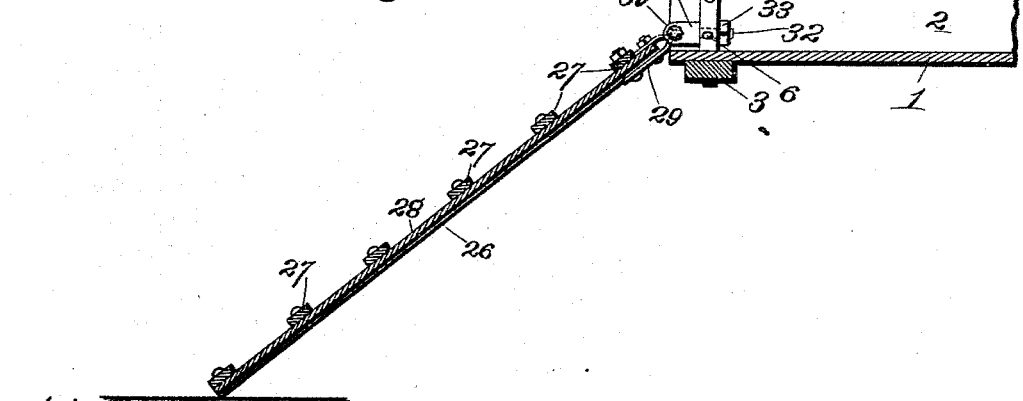

UNITED STATES PATENT OFFICE.

JAMES D. L. JONES, OF BELTON, MISSOURI.

HAY OR STOCK FRAME.

SPECIFICATION forming part of Letters Patent No. 514,472, dated February 13, 1894.

Application filed September 11, 1893. Serial No. 485,291. (No model.)

*To all whom it may concern:*

Be it known that I, JAMES D. L. JONES, of Belton, Cass county, Missouri, have invented certain new and useful Improvements in Hay or Stock Frames, of which the following is a full, clear, and exact description, reference being had to the accompanying drawings, forming a part hereof.

My invention relates to hay or stock frames, and has for its objects to produce a frame of this character which is easily convertible from a hay to a stock frame or vice versa, and which is simple, strong, durable and inexpensive of construction.

The invention consists in the peculiar and novel construction, arrangement and combinations of parts, all as hereinafter fully explained and pointed out in the claim.

Figure 1:
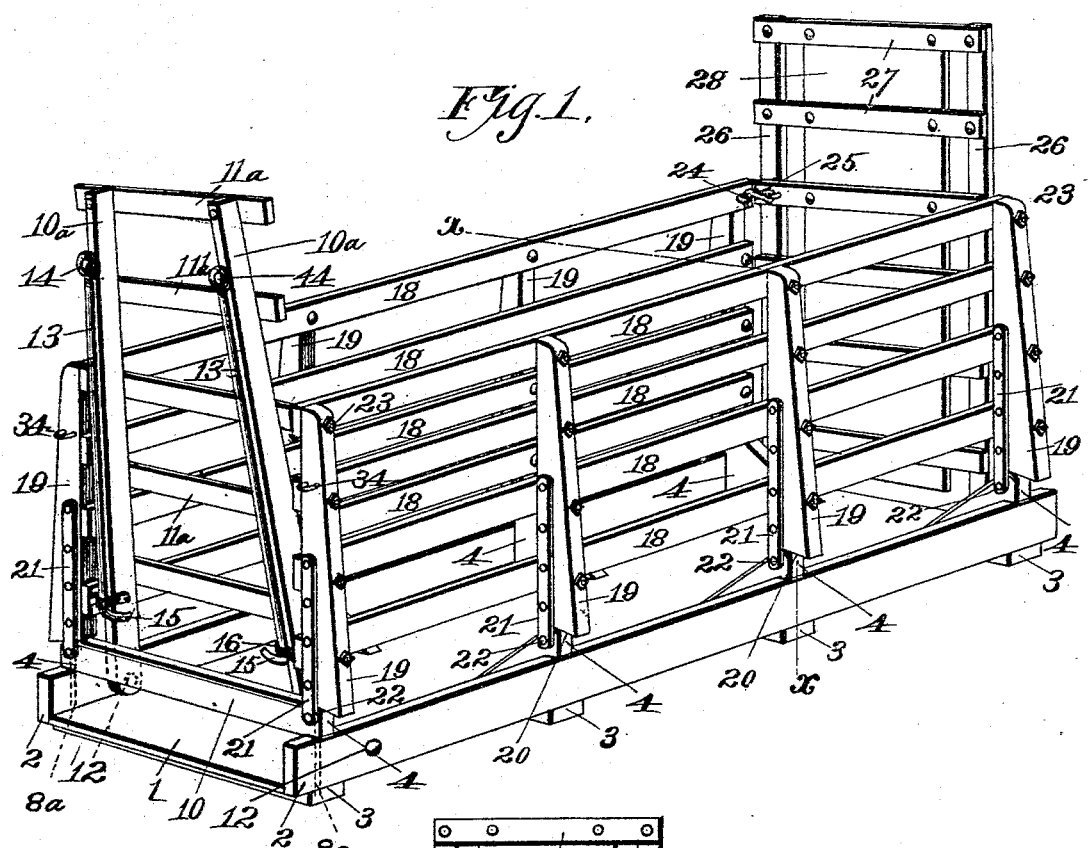
Figure 2:
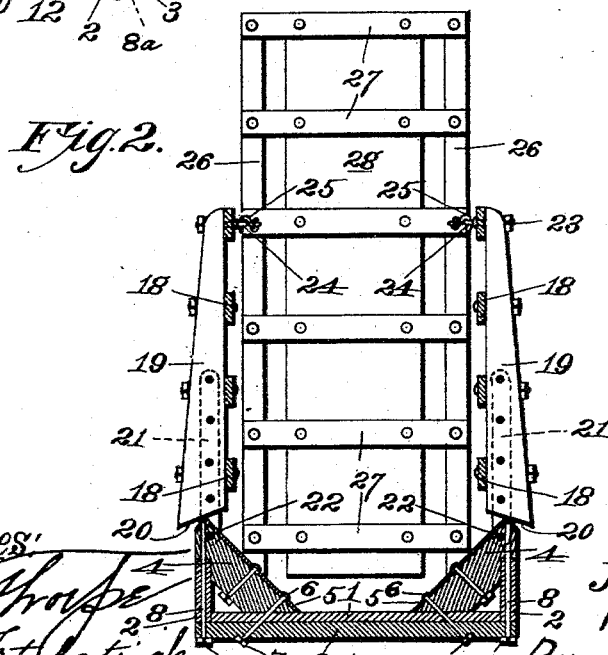

Referring to the drawings, which accompany and illustrate the invention,—Figure 1, is a perspective view of the device, representing it as a stock frame. Fig. 2, is a vertical sectional view of the same, taken on the line $x$—$x$ of Fig. 1. Fig. 3, is an end view of the device, and showing it as a hay frame or rack. Fig. 4, is a vertical longitudinal sectional view of a portion of the device, and showing the pivoted end frame in an inclined position, and resting upon the ground so as to form a way, up which the animals are driven to enter the stock frame.

In the said drawings, the body-portion of the frame consists of the bottom 1 and sides 2 projecting upwardly from the side margins of the bottom. At suitable intervals throughout its length the body-portion is braced by cross-beams 3 secured to and extending transversely of the under side of the bottom, and is also braced by the obliquely arranged knees 4, which bear against the bottom and the inner and upper sides of the sides 2. These knees or inclined braces are provided with wear and strengthening strips or plates 5, of metal, and certain of the bolts which secure the strips in place are extended through the bottom of the body-portion and cross-beams 3 as shown at 6, to secure the knees or braces firmly in position at their inner ends; these bolts being engaged by nuts 7 at their lower ends. The outer ends of the knees or braces are secured in position by the bolts 8 which extend vertically downward through the strips or plates 5, the sides 2, and the cross-beams 3, and are engaged by nuts 9 at their lower ends. At the front end of the body-portion a bar or board 10 extends transversely and resting upon the sides 2—2 at each end is secured firmly in position by bolts $8^a$, which pass downward through the sides and cross-beam 3 in the same manner as the bolts 8, and are engaged at their lower ends by retaining nuts. The front end-frame consists of the upwardly converging bars $10^a$ and the cross-bars $11^a$ which are arranged at suitable intervals apart and are bolted to the bars $10^a$. The bars $10^a$ are pivotally mounted at their lower ends upon bolts 12 passing through the sides 2—2 a suitable distance inward of the end-board 10, and leaning outwardly are supported by the end bar 10. The cross-bars $11^a$ are of uniform length, being in length equal to the width of the body-portion, the upper bars therefor projecting beyond the outer sides of the converging bars $10^a$, as shown. By this construction it is apparent that the end frame may be pivotally moved inward and rest upon the floor of the body-portion when the structure is used simply as a wagon. A pair of brace-rods 13 are pivotally carried at 14 at the outer sides of the bars $10^a$, and are provided with hook-portions 15 at their lower ends, and when the device is arranged as a stock frame these brace rods hang downward and are retained in such position by the spring clasps or catches 16 carried by the side bars $10^a$ near their lower end. The object of these brace rods will be hereinafter explained.

A pair of wings or side-frames are composed of the longitudinally extending and parallel bars 18, which are bolted to the cross-bars or beams 19; these cross-bars or beams being arranged at intervals apart corresponding to the distance between the knees or braces of the body-portion, and the lower or inner ends of the bars or beams 19 are beveled or inclined as shown at 20 for a purpose to be hereinafter explained. A pair of metal bars or plates 21 are bolted upon each side of the bars or beams 19, and have their lower ends projecting a suitable distance beyond or below the inner or lower ends of the said bars or beams, and the parallel bars or plates 21 embracing the upper ends of the knees or braces 4 are pivotally connected thereto or hinged by the cross bolts 22 which pass horizontally through the upper portion of said knees and inward of the vertical tie-bolts 8.

The end-frame at the rear end of the body-portion is slightly different in construction from the end frame described and consists of the parallel bars or rails 26 and the cross or step-bars 27 which are bolted at their opposite ends to the bars or rails 26. This frame is also provided with a board or walk 28 which is bolted to the outer sides of the cross or step-bars 27. The lower end of the bars or rails 26 are provided with brackets 29 which are bolted thereto, and these brackets pivotally engage cross bolts 30 of the bifurcated bearing brackets 31 carried at the outer sides of the rear end knees or cross braces; these brackets being provided with the bolt stems 32 which pass through said knees or braces and are engaged at their inner ends by nuts 33. This end frame is provided with the hooks 25 engaging the eyes 24 of the bolts 23 at the adjacent corners of the side-racks or wings, and is also provided with the brace-rods 13 which are pivotally carried at 14 at its outer side; these brace rods 13 being provided with the hooks 15 at their lower ends. The end frame is also provided with the spring clasps 16 to hold the rods 13 in their vertical and inoperative position when used as a stock frame. When it is desired to convert the stock frame represented in Fig. 1 into the hay frame or rack represented in Fig. 3, it is necessary only to disengage the hooks 25 from the eyes 24 of the bolts 23, and lower the side frames or racks which move pivotally upon the bolts 22, until the inclined or beveled lower or inner ends 20 bear squarely against the vertical outer edge or side of the upper portion of the knee braces, as clearly shown in Fig. 3. The brace rods 13 of each end frame are now disengaged from the spring clasps 16 and moved pivotally outward and have their hooked ends 15 passed through the eyes or staples 34 projecting outwardly from each side-rack or frame near its upper or outer end. From this construction, it will be seen that the weight of the side frames or wings 20 is borne longitudinally by the knees or braces 4, the pivot-bar 10, and by cross bolts 22, and it will be further observed that these pivot-bolts being arranged inward of the vertical tie-bolts 8 the strain is borne not only by the knees or braces 4 and the said cross-bar, but by the whole body-portion. The end-frames are braced near their upper ends by means of the rods 13 which engage the eyes or staples 34; these rods also serving to prevent the hay from falling from the ends of the side racks or wings. When it is desired to use the device as a stock frame, after being first mounted upon the truck of a wagon of any suitable construction, the side frames are pivotally raised to their vertical position as shown in Fig. 1. The opposite or rear end frame is then lowered to the position shown in Fig. 4, and the stock is driven up said frame and between the vertical side frames; the cross bars 27 forming steps upon which the animals are adapted to tread. The rear end frame is now pivotally operated to its vertical position, and the hooks 25 thereof are passed through the eyes 24 of the adjacent bolts 23; thus securing the animals in the stock frame.

From the above description, it will be seen that I have produced a simple, strong, durable and inexpensive hay or stock frame.

Having thus described my invention, what I claim as new, and desire to secure by Letters Patent, is—

In a hay or stock frame, the combination with a body-portion having a number of inner braces or knees, and having side racks or wings pivotally carried by said braces or knees, of an end frame closing one end of the body-portion, and having hooks, and also having pivotal brace rods, and spring clasps engaging the same at times, and a pivotal end frame closing the opposite end of the body-portion, and also having hooks, and also having pivotal brace rods, and spring clasps engaging the same at times, and bolts having eyes carried by the side racks or frames, and adapted to be engaged by the hooks of the end frames; said side-racks or wings also having eyes or staples adapted to be engaged by the hooks of the brace rods, substantially as set forth.

In testimony whereof I affix my signature in the presence of two witnesses.

J. D. L. JONES.

Witnesses:
G. Y. THORPE,
MAUD FITZPATRICK.